United States Patent Office 3,015,928
Patented Jan. 9, 1962

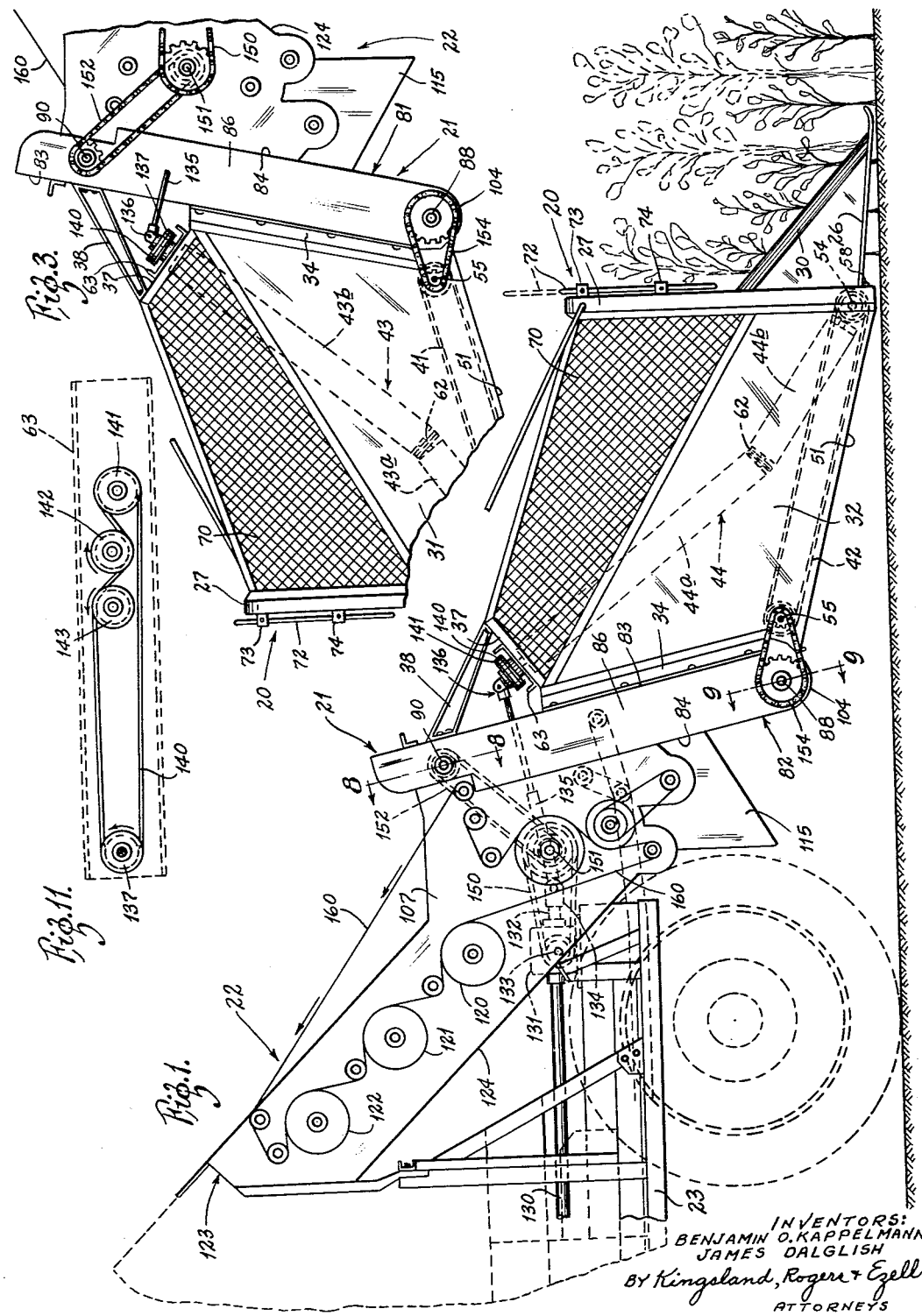

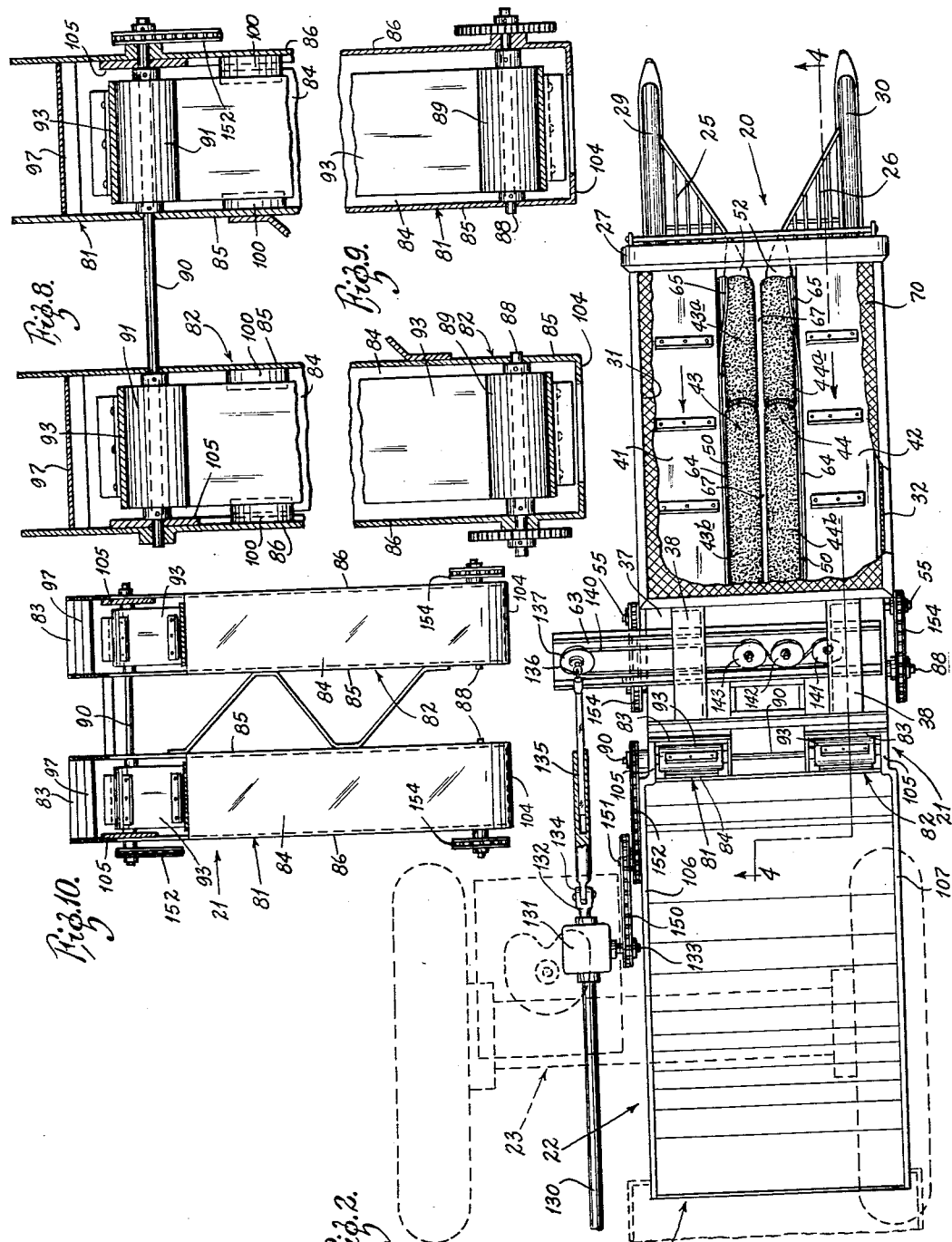

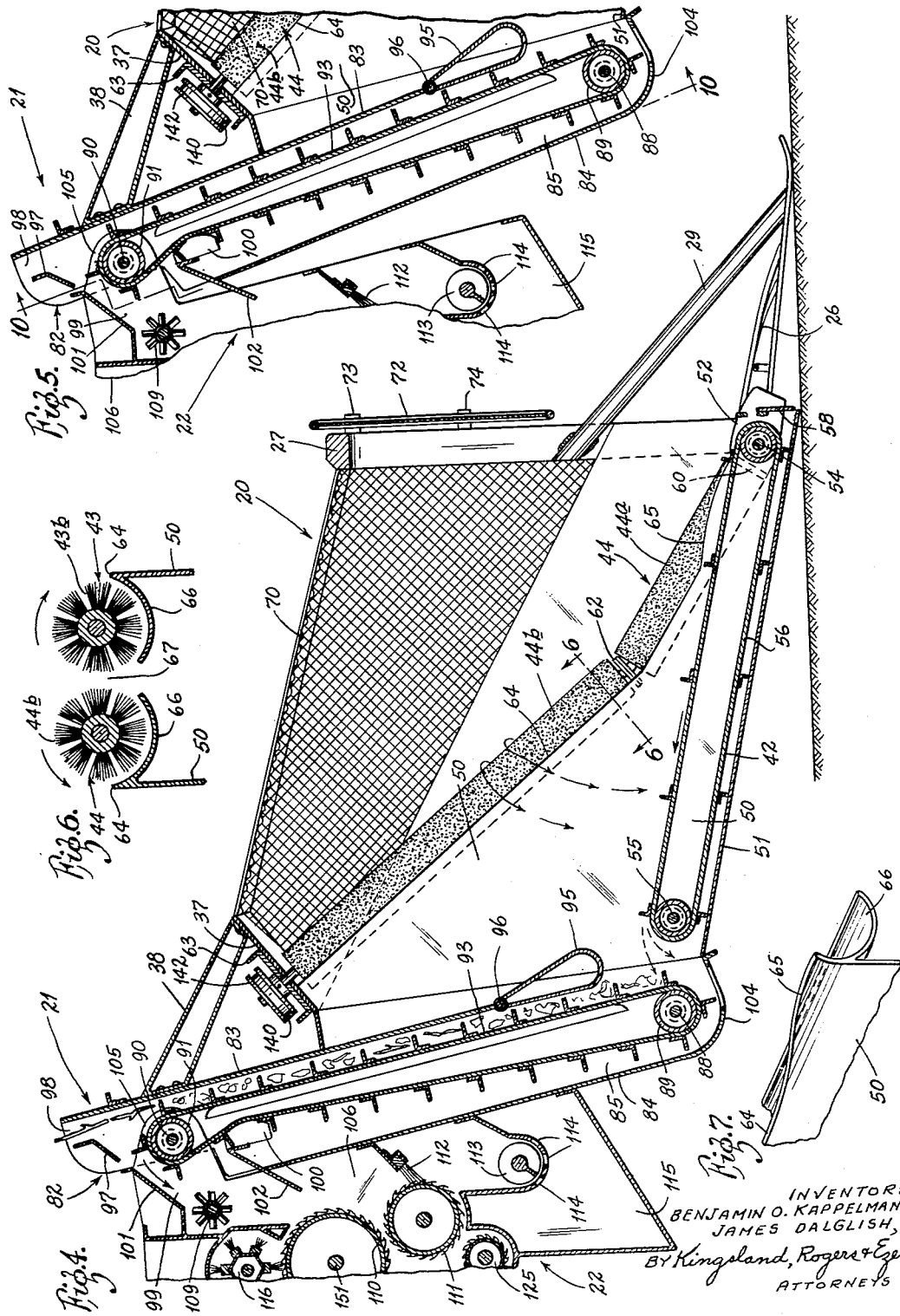

3,015,928
COTTON HARVESTER
Benjamin O. Kappelmann, 4430 N. 32nd St., and James
B. Dalglish, 209 W. Flyn Lane, both of Phoenix, Ariz.
Filed Aug. 1, 1958, Ser. No. 752,527
14 Claims. (Cl. 56—33)

The present invention relates to a cotton harvester. This machine, in its overall construction, comprises a rotary stripper type cotton harvester mechanism that strips cotton from the plants as the machine is driven along the rows, then conveys the cotton rearwardly to an elevator section, wherein the cotton is elevated and delivered to the upper part of a cleaning section containing cleaning and extracting mechanism. All of the foregoing machinery is mounted upon a tractor or the like and therefore is portable. Hence a primary object of the invention is to provide a combined cotton harvester, elevator, and cleaning machine that are all portable for association with a tractor or the like, to harvest cotton from the field and to deliver cleaned cotton into cotton receptacles.

This particular harvesting and cleaning machine is designed so that it will harvest cotton from plants of widely varying height, removing the cotton that grows very low to the ground, as well as that growing high off the ground. It includes two upwardly and rearwardly sloping rotary strippers, associated with belt-type conveyors to conduct the stripped cotton rearwardly. The rotary strippers and conveyors diverge rearwardly, and the conveyors are flanked by walls providing troughs that increase in depth to the rear of the machine. A feature of the invention is to cause the strippers to deliver cotton to the forward part of the troughs in such wise as to avoid accumulating excessive masses of cotton in the shallow forward parts of the harvesting section of the machine.

Another feature of the invention is the provision of a stripping edge associated with the forward parts of each rotary stripper, that deflects cotton from the rotary stripper in a direction adequately upward and rearward to cause it to fall onto the upper reach of a belt-type, continuous conveyor, the level of which may, at the forward end, be as high as, or higher than a horizontal plane through the axis of the rotary stripper. Another object is to provide continuations of the stripping edge of each rotary stripper, around beneath the stripper, to prevent loss to the ground of cotton not removed from the rotary stripper by the stripping edge.

A further feature of the invention is the provision of rotary strippers that slope upwardly to a point high enough to enable the machine to harvest from very high plants, with shield or baffle means that can be adjusted to enable the machine to be used equally well with small plants. The shield constitutes means to prevent a machine large enough to accommodate large plants from throwing cotton harvested from small plants, out of the machine.

The elevator that is associated with the rotary brushes lifts the cotton so that it can be deposited above the bottom part of a cotton cleaning machine in which at least a large part of the trash can be removed. The elevator mechanism itself, is designed to eliminate certain larger trash while the cleaning mechanism can remove and extract the major part of the rest of the trash, and finally can deliver the cleaned cotton to a point sufficiently elevated from the ground to enable it to be deposited into the tops of bags or other cotton receptacles.

It is a feature of this machine to employ a mechanical elevator, located to receive material discharged by the conveyor adjacent the strippers, with means to prevent blocking of the elevator by large plants delived to it by the conveyor. Another feature is means in the elevator to assure a full, free drop of cotton from the top of the elevator, into the cleaning section. Another object is the provision of means to discharge stones, trash, and rocks from the machine in the conveyor and elevator stages, and thereby to avoid delivering them to the cleaning and extracting section.

This application contains certain subject matter of an earlier application by one of the present inventors namely, Serial Number 653,635, filed April 18, 1957, by Benjamin O. Kappelmann, now Patent 2,903,835 of September 15, 1959.

Other objects of the invention will appear from the description to follow:

In the drawings:

FIGURE 1 is a side elevation of the combined cotton harvester, elevator, and cleaning machine, mounted on a tractor or the like that is partially shown in dashed lines;

FIGURE 2 is the plan view of the machine of FIGURE 1, parts being shown in section and other parts being broken away;

FIGURE 3 is a view of parts of the harvester and the cleaning machine near the elevator, taken from the side opposite that of FIGURE 1, to illustrate certain parts of the drive mechanism;

FIGURE 4 is an enlarged longitudinal sectional view substantially along the line 4—4 of FIGURE 2;

FIGURE 5 is a longitudinal sectional view through the elevator portion of the machine, with the harvester section in raised position;

FIGURE 6 is an enlarged section through the lower part of the upper stripper brush portions, taken approximately on the line 6—6 of FIGURE 4;

FIGURE 7 is a perspective view of one of the spiral baffles associated with the lower brushes;

FIGURE 8 is an enlarged transverse section through the upper part of the elevator taken on the line 8—8 at the upper middle of FIGURE 1;

FIGURE 9 is an enlarged similar transverse section through the lower part of the elevator, taken on the line 9—9 of FIGURE 1;

FIGURE 10 is a rear elevation of the elevator, some parts being in section, taken on the line 10—10 of FIGURE 5;

FIGURE 11 is an enlarged transverse view across the top of the brushes showing the belt drive therefor.

Generally speaking, this machine includes three interoperating sections: a cotton harvesting section 20, an elevator section 21, and a cleaning section 22. These are all shown as mounted appropriately on a chassis 23 of a tractor or the like. The harvester normally may extend from the front of the tractor.

Referring first to the cotton harvester section 20, it will be seen that there are two forwardly extending gathering grills 25 and 26, that are mounted on and supported from a U-shaped frame member 27. The gathering members 25 and 26 include forwardly and downwardly sloping, covered braces 29 and 30 that aid in rigidly supporting the gathering grills of the member 27. The purpose for covering the braces, as well as other parts that may be driven against the cotton plants, is to present very dull, rounded surfaces that will minimize breaking of the plants.

Outside wall panels 31 and 32, with appropriate bracing, slope upwardly and backwardly to connect the forward U-shaped member 27 to the elevator section 21. It appears clearly in FIGURES 1 and 3 that angle elements 34 are bolted or riveted to the elevator housing and are also fastened to the side panels 31 and 32, to secure these parts together.

The upper back part of the cotton harvesting section 20 includes a sloping panel 37 that is secured to the front of the elevator section. It is also attached to the front of the elevator section by a pair of braces 38.

The U-shaped forward frame 27 has two brackets that project inwardly toward the longitudinal axis of the harvester section 20, from the lower ends of the two arms of the frame. (These brackets are not shown in the drawing, but will be understood to be nothing more than support members such as would occur to a mechanic). They are designed to provide support for the front end of two conveyors 41 and 42, and two harvesting strippers, here illustrated as cylindrical brushes generally designated 43 and 44. As will later appear, the brush 43 includes a lower forward section 43a and an upper rearward section 43b, and the brush 44 includes a lower forward section 44a and an upper rear section 44b.

The two conveyors 41 and 42 operate in troughs just outside the brushes 43 and 44. The trough for the conveyor 42 will be described, it being understood that the one for the conveyor 41 is similar.

This trough is formed on its outside by the wall 32, and on its inside by a wall 50 that has an upper edge that slopes upwardly and rearwardly adjacent to the brush portions 44a and 44b. The bottom wall 51 joins the wall 32 and 50. The back of the trough is closed by a forward wall of the elevator section 21.

At the forward end of the trough there is an end bracket 52 that is supported between the side walls 32 and 50, by them and the U-shaped front forward frame 27, to which the bracket is also rigidly secured.

The front bracket 52 supports the forward shaft and mounting roller means 54, for the conveyor 42. At the rear of the trough there is a similar rear shaft and supporting roller means 55. A belt-type endless conveyor 56, preferably with cleats at intervals, passes around the two supports 54 and 55. There may be a cross support panel beneath the upper reach of the conveyor 56 but it is not here shown, being omitted for purposes of clarity.

At the forward ends of the trough, and mounted across the front of the front bracket 52, there is a flexible or yieldable curtain 58 that may be made of some material such as the belting material, so that it can yield in an outward direction. This curtain 58 permits rocks that are brought by the lower reach of the conveyor on its return travel, to be expelled from the machine. On the other hand, the curtain will normally prevent ingress of material into the trough. This element 58 has been referred to as a curtain. Obviously it can also be called a gate, since its functions are those of a gate, and in many pieces of apparatus, curtains of this type are designated as gates because their function naturally leads to use of the latter term.

It will be noted that the conveyor extends forwardly and downwardly at a relatively small angle to the horizontal. The illustrated angle is about 20°. While it is desirable to make the vertical height of the top reach the conveyor as low as possible, there are limits beyond which the design may not go. Hence, the upper reach of the conveyor, at its forward end, is substantially above the middle of the brush 44.

As already noted, the two brush sets are located adjacent the edges of the inside walls 50 of the two trough conveyors 41 and 42. These brushes substantially close the middle part of the harvesting section enclosure, but are mounted so as to provide a narrow space between them into which the cotton plants will be fed as the machine is moved along the cotton rows. A description of the mounting of one of the brush sets will suffice since they are both similarly mounted.

The front bracket 52 of the trough extends inwardly, beyond the inner wall of the trough, in the form of a flange to provide a forward bearing 60 for the front end of the brush section 44a. By this means the front end of the brush 44 is revolvably supported upon this front bracket 52.

The brushes are at a considerably greater angle to the horizontal than are the associated conveyors. The lower brush sections are at about 30° to the ground and the upper about 45°. Referring to the brush 44, as typical, the upper end of the brush section 44a revolves in a bearing and universal joint, more or less diagrammatically illustrated at 62. This bearing 62 also supports the lower and forward end of the upper brush section 44b. The upper end of the latter brush section 44b is journalled in a channel-shaped cross member 63, supported across the panel 37 at the upper rear corner of the harvesting section 20.

The inner trough wall 50, adjacent the lower brush section 44a, is provided with an upper edge that acts as a stripping edge for the brush 44. This edge comprises an upper part 64 that is parallel to the axes of the brush sections 44a and 44b, about 30° below the axis of the brush, and that it includes also a lower or forward part 65 that is shaped somewhat helically, so that it curves upwardly and inwardly around the brush section 44a. In the preferred shape, the stripping edge portion 65 curves forwardly and upwardly from the edge portion 64, to a point about 45° above the axis of the stripper brush 44. This edge 65 may extend backwardly about 25% of the length of the conveyor.

The wall 50 is provided with a section 66 that extends down and under the brush sections 44a and 44b. This provides a brush housing or underpanel that prevents loss to the ground of cotton that is carried by the brush past the stripping edge 64-65. This is illustrated clearly in FIGURES 6 and 7.

The wall sections, such as the section 66, may also be called panels, since by definition, wall sections are panels, and where the latter term is used herein, it is intended to mean a portion of a wall or like component of the apparatus.

The two stripper brushes 43 and 44, and their stripping edges, are similar. The plant receiving space 67 between the brushes is designed to receive the cotton plants to be stripped.

The drive for the brushes and the conveyors will be described later. It will be understood that the two brushes 43 and 44 rotate in opposite directions so that cotton is stripped from the plants that are received between the brushes by an upward motion of the adjacent brush surfaces. This direction of rotation of the brushes is illustrated in FIGURE 6, which is a sectional view looking from the front toward the rear of the machine. The stripping edges 64 and 65 are located adjacent the outside surfaces of the brushes and cotton engaged upon the brushes is stripped therefrom when the brushes pass the stripping edges, and thereupon falls into the trough, whence the conveyor can convey it backwardly to the rear end of the harvesting section where the elevator is located.

The brushes are arranged so as to accommodate very tall plants. The division of the brushes into forward and rearward sections permits the upper brush section to reach a maximum height without having the entire brush at an undesirably large angle to the ground, which would produce an excessive tendency to throw cotton out the front entrance opening, and would cause excessive concentration of cotton at the very forward end of the trough where its capacity is least. The lower brush sections are disposed at a shallow angle to the ground, so they can strip low branches and low plants.

The forward frame element 27 is high enough to accommodate the large plants. A grilled hood 70 is mounted over the top of the entire harvesting section of the machine to keep harvested cotton from being thrown out of the machine by the rotation of the brushes. The wall panels, the conveyors or the bottom panels of the troughs, and the hood provide an enclosure for the harvesting section. This hood 70 is high enough to permit the harvesting section to accommodate the very tall plants, however, since the same machine must harvest small plants, as well as large ones. The high hood 70 would permit loss of cotton forwardly through the U-shaped frame 27, except for the provision of a baffle shield or gate across the front of the machine. This consists of a shield 72 mounted for vertical sliding movement on the frame 27 by means of brackets 73 and 74. The shield 72 can confine and send back to the conveyors any cotton that is thrown upwardly and forwardly in the forward end of the harvesting section.

As has previously been indicated, the harvesting section 20 is closely associated with the elevator section 21. As a matter of fact they are integrally constructed, the harvesting section being rigidly mounted upon the elevator section and sharing structural components therewith.

The elevator section 21 actually comprises two connected elevator elements 81 and 82, one disposed behind each of the conveyors 41 and 42, respectively. Since they are similar in design, only one need be described.

The elevator 82 includes a housing having a front wall 83, a back wall 84, and side walls 85 and 86. The side walls 85 and 86 are spaced apart a distance equal to the width of the conveyor trough so that they will form continuations of the walls 50 and 32 of the trough. These several walls are rigidly attached together, to aid in supporting the entire harvester section 20 from the elevator housing.

At the lower part of the elevator section, there is a shaft 88. Within the housing of the elevator 82, the shaft includes an appropriate roller 89. At the top of the elevator section is another shaft 90 that passes through both elevator housings. Within the elevator 82, it has a roller 91. An elevator conveyor 93 passes continuously around the two rollers 89 and 91. This is a belt-type conveyor supplied with cleats as indicated.

The front wall 83 of the elevator has at its lower end a gate 95. This gate is pivoted at 96, to swing forwardly, to prevent extra large plants or masses of cotton carried by the elevator 93 from wedging against the wall 83 and blocking the conveyor.

The top of the housing of the elevator 82 is open and extends to a considerable distance above the shaft 90. There is a baffle 97 at the top, preferably shaped as indicated. Its upper portion is spaced from the front wall 83 of the housing to provide a top passage 98 above the rising reach of the elevator 93, through which large sticks may be driven to escape from the machine. However, the lower part of the baffle directs the cotton backwardly to an entrance passage 99 into the top of the front of the extractor and cleaner section 22.

The conveyor 93 passes over the roller 91 at the top of the housing and then is engaged over deflectors 100 on the side walls 85 and 86 (FIGURES 4 and 8). These deflectors 100 cause the upper part of the elevator 93 to be displaced forwardly, thus giving a free gravity fall for cotton to descend off the elevator, assuring the delivery of all of the cotton into the cleaning section. The entrance 99 for the cleaning section 22, is defined by the baffle 97, an upper baffle 101 overlying the upper part of the elevator, and a lower baffle 102 spaced below the same. The lower baffle 102 underlies the offset portion of the elevator ot receive and direct cotton falling from the elevator. The elevator 93, on its return reaches, descends in the elevator housing ahead of the back wall 84 thereof.

The lower boot 104 of the elevator housing is curved and perforated as shown in FIGURE 4. The cleats will cause small stones or trash that may have fallen from the elevator to fall through the perforations. Rocks and larger trash is delivered to the lower wall 51 of the harvester section 20, where the conveyor 56, on its return travel, can conduct them to the trash release curtain 58 for expulsion from the machine.

The shaft 90 thta drives the elevators actually extends through both elevator housings and through ears 105 that are projections extending forwardly from the side walls 106 and 107 of the cleaning section 22. With this arrangement, the entire forward section, comprising the harvesting section and the elevating section, may be swiveled about the center of the shaft 90 to elevate the forward end of the harvester section in the manner suggested by FIGURE 5. This also gives access to the forward part of the cleaning section 22.

The cleaning section is not shown in detail because it is the subject of an application in the name of Orville Mitchell and Eugene Gordon Walton, Jr., Serial No. 732,960 filed May 5, 1958. Suffice it for present purposes to say that the cleaning section includes a feeder wheel 109 in the inlet 99, assisting in directing the stream of cotton toward the cleaning elements. This feeder should have the shape of a dual helix, so as to distribute the cotton from the infeed from the elevators at the sides, toward the middle of the machine.

Below the inlet 99 there is an extractor saw cylinder 110, toward which the baffle 102 delivers the cotton. Below the saw cylinder 110 there is another saw cylinder 111. The saw cylinder 111 can expel trash past a baffle-supported brush 112. This trash then falls to a lower section where there is a conveyor 113 to conduct the trash out of the machine. Certain hard bolls may pass through openings 114 and descend to a receptacle 115 in the bottom of the machine, if desired.

As the other application shows, the cotton is delivered from the upper cylinder 110 by a doffer 116 into a series of cleaning elements and, finally, is expelled from the upper left of the machine. These cleaning elements are diagrammatically illustrated in FIGURE 1 of the present application by the drive wheels 120, 121 and 122. They will finally expel the cotton through an upper delivery opening 123. Trash containing some recoverable cotton may fall on to the sloping bottom wall 124 and will descend to a reclaiming saw 125, which may recover cotton from the trash and discharge the trash from the machine. Reclaimed cotton is impaled onto the teeth of the saw 125, from which it can be doffed by the adjacent saw cylinder 111 which has a higher peripheral speed than the cylinder 125. In turn, cotton impaled upon the teeth of the cylinder 111 is doffed by the cylinder 110.

The drive for this machine can be from the tractor engine or from a separate drive if desired. Usually there is a power takeoff shaft 130 deriving power from the tractor engine. This passes through a speed reducing gearset 131 that has a longitudinal shaft 132 and a transverse shaft 133.

The longitudinal shaft is connected through a universal joint 134 to a telescopic shaft 135. This shaft in turn is connected through appropriate driving means, here diagrammatically illustrated as a universal joint 136, to a belt pulley 137 that is mounted upon the channel 63. A belt 140 passes around the pulley 137. The opposite end of the belt 140 passes over an idler pulley 141 and thence over two pulleys 142 and 143 in the manner illustrated in FIGURE 11. The pulleys 142 and 143 are mounted on the upper ends of the shaft of the brushes 44 and 43, respectively. By this arrangement the belt drives the two brushes 43 and 44 in opposite directions, as indicated.

The telescopic shaft 135 and the universal joint 136 are diagrammatically illustrated to show a drive that will maintain a driving connection despite adjustment of the entire harvesting section 20 about the center of the shaft 90.

The transverse shaft 133 coming out of the speed reducing gear box 131 operates a chain drive 150 designed to rotate a shaft 151. The shaft 151, in turn, operates another chain drive 152 that drives the shaft 90 on the elevator 93, through a slip connection (not specifically illustrated). The elevator itself then drives the shafts 88 at its bottom and they, in turn, are connected by chain drives 154 to drive the shafts 55 and thereby operates the conveyor in the harvesting section.

The shaft 151 is the shaft upon which the extractor cylinder 110 is mounted, so that the rotation of this shaft drives that cylinder. A reference to FIGURE 1 shows diagrammatically how a belt drive 160 operates the various components of the cleaning machine from this shaft 151. Since the details of this part are more appropriate to the Mitchell & Walton application above mentioned, they are not further set forth here.

*Operation*

The machine can be driven out to the field with the harvester section elevated. At the end of a row to be harvested, the harvester section is lowered to the position illustrated in FIGURES 1 and 4 so that, as the machine goes forward, the gathering members 25 and 26 will gather the plants of cotton and direct them into the harvesting slot 67.

Prior to starting the actual harvesting of a row, the shield 72 is adjusted vertically so that the plants may pass under the shield and into the enclosure of the harvesting section without excessive space between the bottom of the shield and the plants. The lower the shield may be positioned, the less the possible loss of cotton in the harvesting operation.

As the operation proceeds, the drive is operated to cause the brushes 43 and 44 to rotate, the conveyors 41 and 42 to operate, the elevator 93 to operate and the various components of the cleaning section to operate.

As the plants are received in the harvesting slot 67, the stripper brushes 43a and 44a will first engage the lower branches of the plants and strip the cotton therefrom. In this action, the forward ends of the brushes 43a and 44a are very close to the ground. As the brushes engage the plants and take the cotton from them, the cotton is swept against the lower stripping edges 65 which, as heretofore noted, have a shape similar to that of a helix. The effect of the helical edges is to strip the cotton from the brushes and throw it upwardly and backwardly in the harvesting section enclosure, across the troughs, to fall upon the conveyors 56. The purpose of the backward component of travel is to keep the cotton from being thrown forwardly out of the machine by the fast rotating brushes. The purpose of bringing the edge upwardly and forwardly, as illustrated in FIGURES 4 and 7, is to insure that the cotton will be stripped from the brushes at points above the top flights of the conveyors 56. While it is desirable to have the brushes brought as low as possible so as to harvest cotton from the branches that are close to the ground, there has heretofore been a limitation on how close the brushes could be brought, when belt-type conveyors are used. A belt-type conveyor has a certain necessary minimum vertical dimension, and the brushes must deliver cotton to the top thereof. Heretofore it has been the practice to mount the brushes high enough to deliver cotton to the top of the conveyor with a stripper edge more or less like upper edge 64. This made the brushes so high that they failed to harvest the cotton from the lower branches of the plant. By using the helical stripping edge the present machine can obtain the benefits of the belt-type conveyor, and yet have the brushes low enough to strip cotton from very low branches of the plants.

Also, the helical construction of the stripper edge 65 tends to throw the cotton back into the machine and therefore helps to avoid congestion in the lower forward part of the conveyor, where the trough is shallowest and can accommodate the smallest accumulation of cotton.

As the machine proceeds along, the upper parts of the brushes 43a and 44a strip cotton higher and higher on the plants. Finally, the brushes 43b and 44b strip the cotton on the highest parts of the plants.

While it would be possible to make the brushes in the form of single, unbroken brushes at quite a steep angle to the horizontal, instead of in two angularly-related sections as shown, this would cause a serious accumulation of cotton in the lower, shallow forward end of the troughs, where they have little depth to accommodate such excess of cotton. These would also be an undue tendency to throw cotton forwardly out of the machine. Therefore there is a distinct advantages in having the stripper brushes low at the forward part, to avoid congestion of cotton in the forward part of the conveyor trough, and to have the brushes high in the rear so that the machine may be used to harvest cotton from high plants.

In connection with the harvesting of cotton from high plants, the present machine has great advantages over machines with single brushes having the angles of the lower sections here illustrated. For a machine of that type, which incidentally is illustrated in the Mitchell and Walton application above referred to, the high plants must be actually bent over by the back end of the harvesting section, as the machine moves along and dragged through the upper part of the brushes, to strip the cotton from the upper parts of the plant. In certain sections of the country, particularly at certain times of year when harvesting takes place, these high plants are stiff and brittle. Consequently, when they are bent over to force them into positions where the brushes can harvest the cotton from them, they are often broken and the cotton stripped from them is full of sticks and trash and thereby is of lower quality.

So it may be seen that with the present arrangements of the high grill hood, the angularly-disposed stripper brushes, the baffle shield 72, and the helical stripping edges, the same machine may harvest from plants of widely varying height. The only necessary adjustment for different size plants is the adjustment of the baffle or shield 72. Yet the machine is capable of harvesting cotton growing very close to the ground without loss of cotton and without producing an excessive congestion in the lower forward end of the machine.

The cotton is delivered by the continuously moving conveyors 41 and 42, backwardly to the rear ends of the troughs and to the bottom of the elevators 81 and 82. Any rocks may fall off the rear of the conveyors directly down, forwardly of the hump between the bottom wall 51 and elevator boot 104. They will be pushed forward by the conveyor cleats, along the bottom wall 51, until they pass out of the machine throguh the gate or curtain 58.

The elevator elements 93 collect the cotton from the rear of the conveyors and raise it from a level of the back of the conveyors 41 and 42 to a higher position where it may be fed into the upper part of the cleaning and extracting section 22.

The front wall 83 of the elevators shield the elevators from being overloaded by cotton that is thrown directly off the brushes.

If cotton with long stalks is delivered to one of the elevators, its lower gate 95 may yield outwardly against gravity to permit such cotton to be accommodated in the elevator housing between the front wall 83 and the elevator belt 93, without locking the elevator and stopping the machine.

There is, therefore, a feeding action in the operation of this yieldable gate or guide.

As the cotton reaches the top of the elevators, it must do a turn of well over three-quarters of a revolution. If there are large sticks in the elevators, which project upwardly, many of them will not make this turn but will be fed out the tops 98 of the elevator housings, as illustrated in FIGURE 4.

The remaining cotton, including some trash, follows the turn of the elevators over the top shaft 90 and is delivered to the inlet 99 of the cleaning and extracting section. It will be noted that the elevators are deflected forwardly under the shaft 90 by the deflectors 100 so that there is a free fall of cotton from the elevators immediately below the upper elevator supports. This insures that there will be only a minimum, if any, cotton returned by the elevators in their return reaches. The cotton that falls off adjacent the deflectors 100 descends onto the baffles 102 so that it joins all of the other cotton being fed by the feeder roll 109 and gravity down to the cylinders 110 and 111.

It is unnecessary at this point to describe the cleaning and extracting operations. Suffice it to say that the cotton does descend past the cylinder 110 which impales some of it and throws off trash that, in turn, falls to the cylinder 111. This cylinder impales the cotton and drives the trash through the brush 112 where it falls to the screw conveyor 113 and is delivered onto the ground. In the meanwhile, the cotton on the cylinder 111 is doffed by the cylinder 110 which, in turn, is doffed by the doffer 116, and is delivered to further cleaning elements, as all illustrated in the other application.

Any stones or the like, or trash, that could accumulate in the bottom 104 of one of the elevators will fall to the ground through the perforations, or if too large, are delivered by the elevator to the associated bottom wall 51 of the harvesting section. There the lower reach of the conveyor 42 drives the rocks and large trash forwardly until they pass through the curtain 58 to the ground.

In order to prevent injury to the machine when the elevator becomes blocked or jammed, the driving connection 90 for the elevator, includes a torque limiting means such as a slip friction, or the like, drive.

The feeder 109 in the inlet 99 to the cleaning and extracting section is preferably of the type to distribute the cotton fed from the tops of the two elevators evenly across the entire machine. It will be observed that the feeding section is not divided into two halves as is the elevator section 21. The feeder 109 therefore may consist of a double-helix distributor that deflects the incoming cotton toward the center of the machine from the two sides, thereby giving a more even distribution across the cleaning section.

FIGURE 1 shows that in the process of cleaning, the cotton first descends from the inlet of the cleaning section and then thereafter the cotton is caused to move upwardly and rearwardly, while the trash moves downwardly and forwardly. The cotton is ultimately delivered at a relatively high point 123 so that it can flow by gravity into receptacles provided on the tractor. The trash, in the meanwhile, descends and can be thrown out of the machine. Consequently, the cotton delivered to the cotton receptacles is clean cotton and much more valuable than ordinary cotton harvested in a field can be.

While this machine has been described as a cotton harvester, it will be evident that certain of its features may be used in harvesting other crops. Also the invention comprises some combinations that may be effective with different embodiments of the components, as for example, the strippers may be fingered drums instead of brushes. The components illustrated are believed to be the best.

What is claimed is:

1. In a harvesting machine: a harvesting section including stripper means and conveyor means disposed alongside each other, lengthwise of the machine, walls rising alongside the conveyor means providing a trough therefor, an elevator housing adjacent the rear of the trough, the front of the housing forming the rear of the trough, the lower end of the front of the housing having an opening to receive cotton from the rear of the conveyor means, a pivoted, depending panel swingably attached to the front of the housing, freely swingable forwardly from the housing, and overhanging the opening; and an elevator in the housing having means to lift cotton from the opening at the bottom of the housing, past the pivoted panel.

2. In a harvesting machine: a harvesting section comprising an enclosure with its forward end open to receive cotton plants to be stripped; a rotary stripper and means defining a stripping edge adjacent thereto against which the stripper rotates; the rotary stripper and stripping edge means being in the enclosure and disposed longitudinally thereof, along the direction of travel of the machine moving along a row of plants, the stripping edge extending backwardly and downwardly from near the front of the machine to direct cotton stripped from the stripper backwardly in the machine, a conveyor in the enclosure alongside the rotary stripper; the conveyor being of the endless type and extending from the front to the rear of the enclosure at no more than a low angle to the horizontal, the rotary stripper extending at a steeper angle, upwardly and backwardly, the forward end of the conveyor being adjacent the forward end of the stripper with the stripper axis below the top pass of the conveyor; and the stripping edge at the overlapping forward part of the stripper being above the top of the conveyor so as to strip cotton from the stripper and direct it above the top of the conveyor, and back of such overlapping part, the stripping edge extending backwardly and downwardly.

3. In a harvesting machine: a harvesting section comprising an enclosure having walls with its forward end open to admit plants as the machine moves along a plant row; a rotary stripper in the enclosure extending upwardly and rearwardly from adjacent the ground at the open end of the enclosure; a conveyor of the endless belt type with an upper pass moving rearwardly in the enclosure alongside the stripper and extending from adjacent the forward end of the stripper rearwardly at a lower angle to the ground than that of the stripper, the enclosure walls alongside the conveyor providing a trough of increasing depth rearwardly, a stripping edge on an enclosure wall to lie adjacent the stripper to cause cotton from the stripper to be removed therefrom and to fall on the conveyor, the forward end of the rotary stripper having over half its vertical dimension below the top of the conveyor, and the stripping edge in its forward portion curving from below the middle of the rotary stripper forwardly and over the upper part thereof to be always above the top of the upper pass of the conveyor, to direct cotton from the rotary stripper rearwardly from the open forward end of the machine and onto the top of the conveyor.

4. The machine of claim 3, wherein there is an adjustable shield on the enclosure, movable to be raised or lowered across the upper part of the front opening to regulate the height of the opening to the height of the plants being stripped.

5. In a harvesting machine: a harvesting section comprising an enclosure with a forward opening to receive plants, an upwardly and rearwardly extending rotary stripper therein against which plants may be brought and stripped of cotton by upward rotation of the side of the stripper against the plants, stripping means against which the rotary stripper may drive the cotton, and an adjustable shield on the enclosure, movable to regulate the height of the enclosure to the height of the plants being stripped, and to minimize loss of cotton thrown upwardly and forwardly by the rotary stripper.

6. The machine of claim 5, wherein the stripping means includes an edge that, adjacent the forward part of the stripper, curves forwardly and upwardly over the stripper, to impart to the cotton stripped from the stripper, an upward and rearward direction of movement.

7. The machine of claim 5, wherein the enclosure includes two of the rotary strippers spaced apart to receive plants between them and strip opposite sides of each plant, and wherein there are conveyors, one outside of and alongside each stripper, the conveyors having a lower slope than the strippers, the forward ends of the conveyors extending forward of the forward ends of the strippers, and each rotary stripper having a stripping edge as described, which edge is always above the top of the conveyor.

8. In a cotton harvester, an enclosure having a front opening to receive plants to be stripped; two rotary strippers in the enclosure extending lengthwise thereof in parallel relationship, means for rotating the strippers oppositely, with their adjacent sides moving upwardly, means providing a stripping edge in the enclosure for each rotary stripper comprising a wall that extends alongside the rotary stripper, at its outer side to be engaged by cotton on the stripper and a wall extending around under the rotary stripper from the edge, the two latter walls providing the plant-receiving space between them, and extending far enough around each stripper that cotton passing the stripping edges and expelled from the stripper beyond the under wall will be given an upward thrust toward the other stripper.

9. In a cotton harvesting machine: a harvesting section having means to strip cotton from plants and means to convey it rearwardly to an elevator section; the elevator section comprising an elevator housing having a lower forward opening to receive cotton from the conveying means, and an upper, rear discharge opening, a continuous belt type conveyor in the housing having cleat means, to elevate cotton and discharge it through the discharge opening; the conveyor having upper and lower rollers on which it moves, the housing having an opening at its top, the housing having wall means disposing the opening above the upper roller and above the rising reach of the elevator, so that long sticks may be forced out the opening instead of turning over the top roller with such movement of the conveyor over that roller.

10. In a harvesting machine: a harvesting means movable along rows of cotton plants, having mechanism to strip cotton from the plants, and endless-belt conveyor means to receive stripped cotton and convey it rearwardly of the machine, a floor panel beneath the conveyor, the return pass of the conveyor moving above the panel, an elevator spaced from the rear of the conveyor a distance permitting descent of trash bodies from the top of the conveyor at its rear end, onto the floor panel, but close enough to cause cotton to pass from the back of the conveyor and be picked up onto the elevator; and the floor panel providing an exit to permit escape of the trash bodies.

11. In the machine of claim 10: the exit being adjacent the forward end of the floor panel at the front of the conveyor, and a swinging gate at the front that swings open to permit egress of trash bodies, and closed to restrict ingress through the exit.

12. In a harvesting machine: a harvesting means movable along rows of cotton plants, having mechanism to strip cotton from the plants, and endless-belt conveyor means to receive stripped cotton and convey it rearwardly of the machine, an upright elevator adjacent to the rear of the conveyor to receive cotton from the conveyor and to elevate it, side walls enclosing the conveyor and the elevator, a forward wall panel extending downwardly in front of the elevator and terminating above the bottom thereof, and a freely-swinging gate depending from the panel, and displaceable forwardly therefrom.

13. In the machine of claim 12: the elevator comprising a cleated endless belt, the side walls and panel of the elevator terminating adjacent the top thereof and providing a stick opening aligned with the upward pass of the elevator, to enable large sticks to pass out; and the walls providing a cotton discharge outlet beyond the stick opening.

14. In a harvesting machine: a harvesting section including a plant stripper and a conveyor to receive material stripped from the plant and convey it rearwardly; an elevator connected to the harvesting section at the rear of the conveyor to receive material from the conveyor and to elevate it, including a movable conveying means and a rotatable shaft at the top of the conveyor to drive the conveying means; a cleaner back of the elevator to receive material from the elevator including movable cleaning elements; swivel means pivotally connecting the elevator and its connected harvesting section to the cleaning section for swinging of the forward end of the machine upwardly about the center of the rotatable shaft; and drive means connecting the movable cleaning elements and the rotatable shaft for operation from a common power source, the swivel mounting of the elevator about the axis of the said shaft enabling such swivelling without upsetting the said operation.

References Cited in the file of this patent

UNITED STATES PATENTS

| | | |
|---|---|---|
| 1,638,867 | Melton | Aug. 16, 1927 |
| 2,049,640 | Conrad | Aug. 4, 1936 |
| 2,064,394 | Thomann | Dec. 15, 1936 |
| 2,406,058 | Boone | Aug. 20, 1946 |
| 2,533,510 | Roscoe | Dec. 12, 1950 |
| 2,677,226 | Hyman | May 4, 1954 |
| 2,677,227 | Caldwell | May 4, 1954 |
| 2,691,861 | Lock et al. | Oct. 19, 1954 |
| 2,692,467 | Bigler | Oct. 26, 1954 |
| 2,707,364 | Wagnon | May 3, 1955 |
| 2,760,325 | Witt | Aug. 28, 1956 |
| 2,825,195 | Smith | Aug. 28, 1956 |
| 2,903,835 | Kappelmann | Sept. 15, 1959 |